United States Patent [19]

Wiltshire

[11] Patent Number: 5,039,206
[45] Date of Patent: Aug. 13, 1991

[54] LIQUID CRYSTAL DISPLAYS

[75] Inventor: Michael C. Wiltshire, High Wycombe, England

[73] Assignee: The General Electric Company, p.l.c., England

[21] Appl. No.: 391,526

[22] PCT Filed: Dec. 2, 1988

[86] PCT No.: PCT/GB88/01072
§ 371 Date: Jul. 24, 1989
§ 102(e) Date: Jul. 24, 1989

[87] PCT Pub. No.: WO89/05471
PCT Pub. Date: Jun. 15, 1989

[30] Foreign Application Priority Data

Dec. 2, 1987 [GB] United Kingdom ............... 8728137

[51] Int. Cl.⁵ .............................................. G02F 1/13
[52] U.S. Cl. ........................................ 359/50; 359/97
[58] Field of Search .............. 350/345, 349, 350 F, 350/331 R, 332, 334; 340/784, 765

[56] References Cited

U.S. PATENT DOCUMENTS

| 4,107,307 | 9/1979 | Cirkler et al. | 350/345 |
| 4,425,029 | 1/1984 | Funada et al. | 350/350 F |
| 4,556,287 | 12/1985 | Funada et al. | 350/350 F |
| 4,560,239 | 12/1985 | Katz | 350/331 R |
| 4,769,639 | 9/1988 | Kawamura et al. | 350/332 |
| 4,846,559 | 7/1989 | Kniffler | 350/332 |

FOREIGN PATENT DOCUMENTS 0200332  9/1987  Japan ................................. 350/345

Primary Examiner—Michael C. Wimer
Assistant Examiner—Tan Ho
Attorney, Agent, or Firm—Kirschstein, Ottinger, Israel & Schiffmiller

[57] ABSTRACT

In order to control the brightness of a fluorescent liquid crystal display, a photodiode is located adjacent an edge of a display cell. The photodiode receives light which has been totally internally reflected within the cell and which is thereby emitted from the cell edge. The emitted fluorescence remains subtantially constant during switching of the display and is a measure of the brightness of the display. The output of the photodiode is fed to a circuit which controls the brightness of the light source illuminating the display, so that a substantially constant display brightness is obtained.

10 Claims, 1 Drawing Sheet

LIQUID CRYSTAL DISPLAYS

BACKGROUND OF THE INVENTION

1. Field of the Invention

This invention relates to liquid crystal displays (LCDs), and particularly to the automatic control of the brightness of fluorescent LCDs. Description of Related Art Fluorescent liquid crystal displays combine the visual impact of emissive (i.e. non-liquid crystal) displays with the virtues of liquid crystal display (LCD) technology. Fluorescent LCDs are uniformly bright and have a hemispherical angle of view, yet complex display patterns can be manufactured cheaply. They are readily visible in low ambient light levels at which conventional LCDs are hard to read, yet do not wash out in high ambient light levels as do conventional emissive displays.

Such a fluorescent LCD is described in our British Patent Specification No: 2,169,092A and in an article by R. Van Ewyk et al in Displays, Oct. 1986, 155-160. A pleochroic fluorescent dye, such as that described in our British Patent Specification No: 2,189,502A, is dissolved in a liquid crystal, and the mixture is used to fill a conventional LCD cell. Both the fluorescence and the light absorption by such a display are anisotropic. In a fluorescent LCD such as is described in the above references, when no electric field is applied to a segment of the display, there is strong absorption of some stimulating radiation and consequently strong fluorescence from the display. When a field is applied, however, the liquid crystal and dye molecules realign so that there are only weak absorption and weak fluorescence. Hence, the display generally consists of dark characters on a bright background.

It is also possible to construct a fluorescent liquid crystal display so that the unswitched area produces only weak fluorescence and the switched areas produce strong fluorescence. This type of display then consists of bright characters on a dark background and is the reverse-contrast form of the display.

The stimulating radiation may interact either directly or indirectly with the dye. In the former case light is absorbed by the dye molecules which subsequently fluoresce at a longer wavelength. In the case of the perylene diesters which we have described in the above-mentioned publications, blue light is absorbed and green light emitted. Alternatively, the fluorescence may be stimulated by indirect excitation. In this case, the incident radiation is absorbed by some other species in the mixture, such as the liquid crystal or some other deliberately-introduced molecule. This then transfers the absorbed energy, either radiatively or non-radiatively, to the dye which subsequently fluoresces. In the above-mentioned perylene system, indirect stimulation can be effected by ultraviolet light, which is invisible, while the fluorescence remains in the green.

The stimulating radiation may be provided by a number of sources simultaneously. For example, an ultraviolet (UV) fluorescent tube acting as a backlight may be the primary stimulant, while additional stimulation may be provided by ambient UV and/or by blue light. All such sources will contribute to the brightness of the display. For a given light output from the fluorescent tube the brightness of the display will therefore vary in dependence upon the ambient light. As the fluorescent tube ages, its brightness will diminish and, for a given ambient light level, the brightness of the display will therefore decrease. In addition, the efficiency of the LCD itself will diminish with age.

SUMMARY OF THE INVENTION

It is an obJect of the present invention to provide automatic control of the brightness of a fluorescent LCD, in order to alleviate the above-mentioned disadvantages of known displays of that kind.

According to the invention there is provided a fluorescent liquid crystal display (LCD) system, comprising a fluorescent liquid crystal cell having a first major surface at a viewing side thereof, a second major surface on the reverse side thereto and edges interconnecting said maJor surfaces; light-sensitive means positioned to receive fluorescence emitted from a said edge and to produce an output dependent upon the brightness of that fluorescence; and means responsive to the output of the light-sensitive means to control the brightness of a light source illuminating the cell.

Preferably the light source is a fluorescent lamp and preferably the light source is positioned to illuminate the cell via said second major surface.

BRIEF DESCRIPTION OF THE DRAWINGS

An embodiment of the invention will now be described, by way of example, with reference to the accompanying drawing, in which.

DETAILED DESCRIPTION OF THE PREFERRED EMBODIMENT

Figure 1:
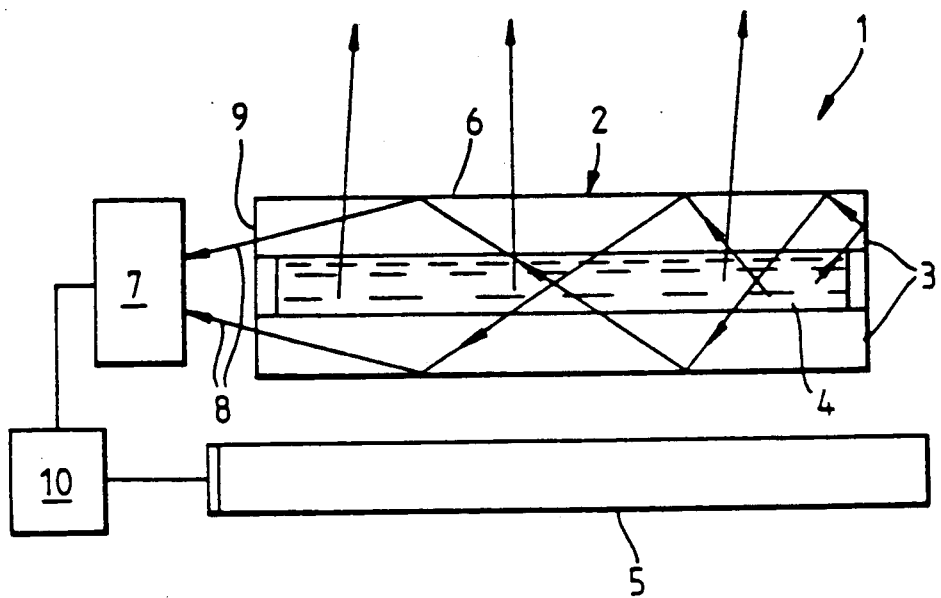
FIG. 1 is a schematic cross section of a liquid crystal display incorporating a fluorescent liquid crystal cell.

Referring to FIG. 1, a liquid crystal display 1 comprises a liquid crystal cell 2 which is constructed in a conventional manner and comprises two glass plates 3 which are assembled with a spacing of typically 8 μm. On its inner surface each plate 3 carries a transparent electrode pattern and a suitable aligning layer (not shown) for a liquid crystal layer 4. The liquid crystal layer comprises a nematic liquid crystal, for example a material designated E7 supplied by BDH Ltd., into which has been dissolved approximately 1% by weight of a fluorescent dye such as 3,9 or 10-bis (4-n-pentyl-bicyclo (2.2.2) oct-1-yl) perylene dicarboxylate. The cell is illuminated by a fluorescent lamp 5 which is located behind the cell 2 and which emits light in the region of 350 nm, suitable for stimulating fluorescence of the dye indirectly. The display can be switched on and off by applying an electric field from an external voltage source (not shown) between the transparent electrodes.

Much of the light emitted by the fluorescent dye in the liquid crystal material emerges from the viewed face 6 of the display. However, some fraction of this light is totally internally reflected, generally at the interfaces between the glass plates 3 and the outside atmosphere, and emerges from the edges of the cell. The intensity of the light emitted at the edges is proportional to the brightness or intensity of the display itself. Since the area of the display which is being switched at any instant is generally small compared with that which is not being switched, and since the order parameters of the dye and the liquid crystal are not unity (i.e. they are imperfectly aligned), the light emitted from the edges of the cell remains substantially constant during switching. Hence, variations in the light emitted from the edges of the cell are largely caused by variations in the overall brightness of the cell itself due to changes in the level of stimulating radiation or in the efficiency of fluorescence of the dye. Hence, when the cell is strongly stimulated by ambient light, the fluorescent lamp 5 can be switched off, and when the external stimulation is reduced, the lamp is progressively switched on to maintain the cell brightness at a constant level.

Control of the brightness of the cell is effected by a photodiode 7 which is located so as to detect the fluorescence 8 energing from an edge 9 of the cell. The photodiode is connected to a control circuit 10, which controls the intensity of the fluorescent lamp 5.

Figure 2:
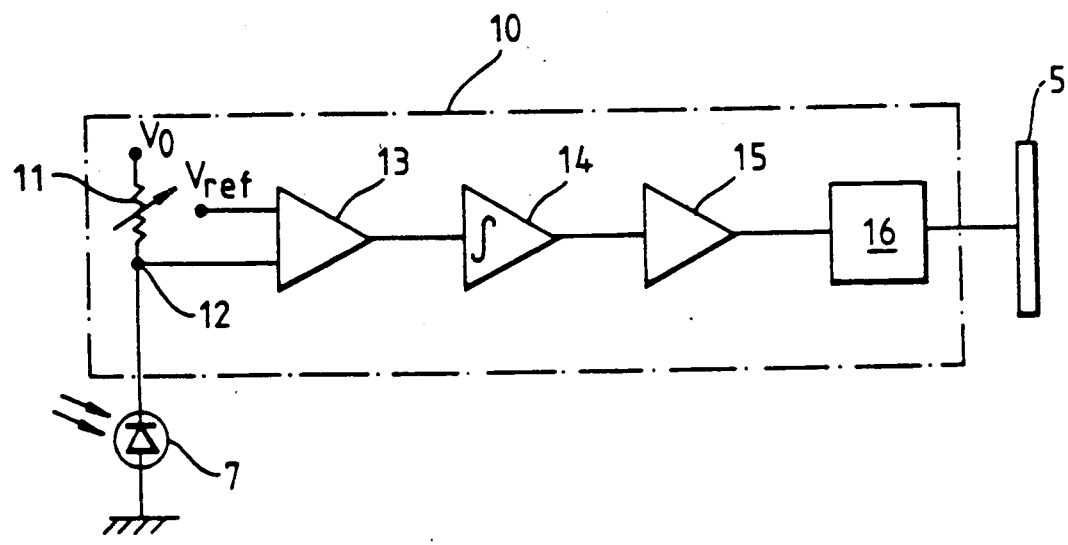
FIG. 2 is a schematic block diagram of a circuit for controlling the brightness of the cell of FIG. 1.

A schematic block diagram of the control circuit 10 is shown in FIG. 2. The photodiode 7 is connected in series with a variable resistor 11 between a fixed volta $V_o$ and ground. A voltage $V_p$ at the junction 12 between the photodiode 7 and the resistor 11 then depends on the intensity of light falling on the photodiode. The volta $V_p$ is fed into one input of a differential amplifier 13. A reference volta $V_{ref}$, the value of which is selectable by the user of the display, is connected to the other input of the amplifier. The output of the amplifier 13 is fed to an integrating amplifier 14, the output of which is connected to a buffer amplifier 15. The voltage output of the amplifier 15 controls the fluorescent lamp 5 via a lamp drive circuit 16.

By operation of the circuit, the intensity of the fluorescent lamp can be controlled, in dependence upon the light intensity detected by the photodiode 7, to maintain a constant cell brightness. The variable resistor 11 controls the sensitivity of the control circuit, and the required brightness of the display is set by selecting an appropriate value $V_{ref}$.

An additional photodiode (not shown) could be incorporated in the reference voltage circuit to make automatic adjustments for the ambient brightness, as a less bright display is required in dim lighting than in strong lighting.

The circuit of the present invention therefore operates to control the brightness of the backlight, i.e. the lamp 5 so that it is dim when there is sufficient excitation from external sources and bright when such sources are dim, thereby providing a constant fluorescence output from the cell. It also compensates automatically for changes in brightness o both the backlight and the cell as a function of time, for the output of both of these elements decreases with increasing usage or age. Furthermore, it can serve to optimise the lifetime of these components, as their lives depend on the brightness which they are required to produce. Thus, early in their lives, both the backlight and the fluorescent LCD cell can be excited at less than their maximum output, thereby prolonging their working life (for example, if half the maximum brightness is acceptable, the half-life of the display will be approximately doubled). It is also possible to provide for the individual LCDs in a multi-cell display to be adjusted to give equal brightness, and to be maintained equally bright independently of their different fading rates. Moreover, if a single cell has to be replaced, its brightness can be set, and automatically held, equal to that of the other elements in the display.

Although in the above embodiment a fluorescent tube acting as a backlight is controlled by the circuit 10, it would be possible for the circuit 10 to control, alternatively or additionally, another light source, either behind or in front of the cell, to maintain the fluorescence at the required level.

The fluorescent liquid crystal cell in the above-described embodiment is of the conventional type, in which the unswitched areas produce strong fluorescence and the switched areas produce weak fluorescence. However, the invention is also applicable to cells which operate in the reverse manner, i.e. in a reverse-contrast type of display.

I claim:

1. A fluorescent liquid crystal display system, comprising: a fluorescent liquid crystal cell switchable between a fluorescent state and a non-fluorescent state and having a first major surface at a viewing side of the cell, a second major surface on a reverse side of the cell, and edges interconnecting said major surfaces; a light source having a brightness, and operative for illuminating the cell; light-sensitive means positioned to receive edge fluorescence emitted from one of the edges, said edge fluorescence having a brightness which is substantially independent of the state of the cell, said light-sensitive means being operative for producing an output dependent upon the brightness of the edge fluorescence; and control means responsive to the output of the light-sensitive means for controlling the brightness of the light source illuminating the cell.

2. A system as claimed in claim 1, wherein the light source is so located as to illuminate the cell via said second major surface.

3. A system as claimed in claim 2, wherein the light source comprises a fluorescent lamp.

4. A system as claimed in claim 1, wherein the light source comprises a fluorescent lamp.

5. A system as claimed in claim 1 wherein the control means comprises a differential amplifier having a first input to which the output of the light-sensitive means is coupled, a second input to which is fed a reference voltage and an output.

6. A system as claimed in claim 5, wherein the reference voltage is controllable to adjust the brightness of the output of the cell.

7. A system as claimed in claim 6, wherein a lamp drive circuit is operatively connected to the output of the differential amplifier.

8. A system as claimed in claim 4, wherein a lamp drive circuit is operatively connected to the output of the differential amplifier.

9. A system as claimed in claim 8, including integrating amplifier means operatively connected between the differential amplifier and the lamp drive circuit.

10. A system as claimed in claim 1, including second light-sensitive means operative to provide additional control of the brightness of the light source in dependence upon the brightness of ambient light in the operating environment of the cell.

* * * * *